May 4, 1965

P. D. HUNT ETAL 3,181,372

COMPENSATED FLYWEIGHT

Filed Sept. 29, 1958

Fig. 1

Fig. 2

PAULMER D. HUNT
JAMES R. GOERKE
INVENTORS

BY Cecil F Arens

ATTORNEY 3,181,372
COMPENSATED FLYWEIGHT
Paulmer D. Hunt and James R. Goerke, South Bend, Ind., assignors to The Bendix Corporation, a corporation of Delaware
Filed Sept. 29, 1958, Ser. No. 763,887
13 Claims. (Cl. 73—497)

The present invention relates to centrifugal weight members and more particularly to centrifugal weight members to be rotated in a fluid medium.

It is often necessary when utilizing centrifugal weight members, to rotate said flyweights in a fluid medium. For example, in the gas turbine engine fuel control art, flyweights are commonly included as part of a fluid immersed governor apparatus as illustrated in U.S. Patents 2,644,513, F. C. Mock, issued July 7, 1953; and 2,705,047, H. J. Williams et al., issued March 29, 1955 (common assignee). In such applications the rotating action of the flyweights cause a rotation of fluid resulting in a pressure gradient in the surrounding fluid that increases with the distance from the spin axis of the governor mechanism. This fluid pressure gradient acts over the surface of the rotating centrifugal weights producing an undesirable force acting on the flyweights. The force is particularly undesirable because it depends on the density of the fluid medium, which in turn changes with temperature, and is different for various fluids such as fuel, oil, or the like.

Accordingly, it is an object of the present invention to provide a centrifugal weight member adaptable for operation in a fluid medium and insensitive to changes in fuel due to variations of temperature or type.

It is another object of the present invention to provide a centrifugal weight member having a counter weight of different density to eliminate variations due to density change of the fluid in which said centrifugal weight is operating.

Other objects and advantages of the present invention will become apparent from the following description and accompanying drawings wherein:

FIGURE 1 is a cross sectional view of a fluid immersed governor apparatus having a centrifugal weights in accordance with the present invention, and FIGURE 2 shows the novel centrifugal weights of the present invention disassociated from the remaining governor apparatus.

Referring to FIGURE 1, a housing 12 having a fluid inlet conduit 14 and a fluid outlet conduit 16 forms a fluid containing chamber and governor housing. A plurality of centrifugal weight members 18 are contained within housing 12 and pivotably secured to brackets 20 at pinned connection 22. Said brackets are in turn secured to a rotatable spin table 24 at a spaced distance from its axis of rotation. The centrifugal weight members 18 are each comprised of a flyball element 26, a counterweight element 28, and a lever or foot member 30. A rotatable input shaft 32 is secured to spin table 24 and extends externally through housing 12 where it is connected to a gear 34 which is adaptable to receive a rotating input, such as an engine speed or the like. An axially movable shaft 36 includes a diametrically enlarged portion 38 on one end which contacts foot member 30; said shaft extends through housing 12 where a pilot valve 40 is formed on its opposite end. Pilot valve 40 is operative with a supply of control fluid in conduit 42 to control the position of piston 44 in a manner well known to those skilled in servo control art. Piston 44 includes a first axially movable rod 46 operative to control the speed of an engine, not shown, as by controlling the position of an accelerator, throttle lever, valve or the like. A second axially movable rod 48 is positioned by movement of piston 44 and extends into housing 12 where it positions movable retainer 50 and spring 52 to provide a feedback balancing force to member 38 that is responsive to the position of piston 44.

Certain of the novel design features of centrifugal weight 18 can be more clearly described by an analytical analysis of the forces acting on said weight. Accordingly, the significant forces acting on centrifugal weight 18 are illustrated in FIGURE 2, where:

$F_c$ represents the centrifugal forces generated by the rotary motion and acting radially outward at the respective centroids of flyball element 26 and counterweight 28;

$F_p$ represents the net forces due to fluid pressure acting on centrifugal weight 18 acting radially inward at the centroid of the respective weight elements; and $F_o$ represents the reaction force acting on foot element 30, which forms a moment equal and opposite in direction to the output moment produced by centrifugal weight 18. The axis of rotation and a line perpendicular thereto passing through pivotable point 22 form a pair of coordinate reference lines for the following analytical analysis.

Centrifugal force $F_c$ may be expressed as:

(1) $$F_c = Mr_1\theta^2$$

where the symbols have the following meaning:

$M$ = spinning mass
$r_1$ = radial distance of centroid of mass to axis of rotation
$\theta$ = angular velocity The following relationships are also well known:

(2) $$M = dV$$

(3) $$\theta = (\text{constant}) N$$

where $d$ is density of the mass and $V$ its volume, and $N$ is rotating speed in r.p.m.

Substituting Equations 2 and 3 in Equation 1 gives:

(4) $$F = {}_cKN^2 dVr_1$$

where K is a constant.

Pressure intensity within a cylindrical container filled with liquid and rotated at a constant angular velocity about its vertical axis is:

(5) $$P = \frac{j\theta^2 r^2}{2g}$$

as set forth in the text "Elementary Mechanics of Fluids," by H. Rouse, page 69, and where $j$ is fluid density. The equation may be expressed in terms of force acting over a particular area within said cylinder as:

(6) $$F = \frac{j\theta^2 r^2 A}{2g}$$

where A is the area of an object over which the pressure acts.

Turning to FIGURE 2, the fluid pressure force $F_p$ acting on flyball element 26 and counterweight 28 is the difference between the fluid pressure force acting over the inwardly extending surface and the force acting over the outwardly extending surface and may be expressed:

(7) $$F_p = F_o - F_i = \frac{j\theta^2 r_o^2 A_o}{2g} - \frac{j\theta^2 r_i^2 A_i}{2g}$$

but since the radially inward projected area of an object equals its radially outward projected area, $A_o$ and $A_i$ are the same and may be characterized by the single symbol A. Then:

(8) $$F_p = \frac{j\theta^2 A}{2g}(r_o^2 - r_i^2)$$

factoring the radical:

(9) $$F_p = \frac{j\theta^2 A}{2g}(r_o - r_i)(r_o + r_i)$$

and since $r_o - r_i$ is the width (W) of the weight elements and $r_o + r_i$ equals $2r_1$ Equation 9 may be expressed:

(10) $$F_p = \frac{j\dot{\theta}^2 A W r_1}{g}$$

Also, area A times width W is equal to volume so that:

(11) $$F_p = \frac{j\dot{\theta}^2 V r_1}{g}$$

Substituting Equation 3 in equation 11 gives:

(12) $$F_p = K N^2 j V r_1$$

It should be noted, that there is substantial similarity between Equations 4 and 12 so that for purposes of clarity all symbols specifically referring to flyball element 26 will be identified with subscript 1 and symbols referring to counterweight 28 will bear subscript 2.

The output force $F_o$ may be expressed in terms of other forces by taking the sum of the moments about pivotable point 22:

(13) $$F_o Z = [F_{c1} Y_1 - F_{c2} Y_2] - [F_{p1} Y_1 - F_{p2} Y_2]$$

Substituting Equations 4 and 12 in Equation 13:

(14) $$F_o = \frac{2KN^2}{Z}((V_1 r_1 Y_1) d_1 - (V_2 r_2 Y_2) d_2 - j[(V_1 r_1 Y_1) - (V_2 r_2 Y_2)])$$

if by design:

$$V_1 r_1 Y_1 = V_2 r_2 Y_2$$
$$d_2 < d_1$$

then the equation reduces to:

(15) $$F_o = \frac{2KN^2}{Z}((V_1 r_1 Y_1)(d_1 - d_2))$$

Then regardless of the change in fuel density $j$ the output force $F_o$ is constant at design speed N. Thus the object of the invention to achieve a centrifugal weight for rotating in a fluid medium that is sensitive to density changes of the fluid in which it is rotating is attained. It should be noted, that it is not necessary that the separate characteristics of the flyball 26 and counterweight 28 of V, r and y be equated, but only their product. Thus, for example, it is not necessary that the volume of both said flyball and said counterweight be the same but only the product of volume times the dimensions $r$ and $y$.

The present invention has been described by use of precise mathematical formulae to illustrate more clearly the object and function of the present invention. The formulae used, however, should not be construed as an unnecessary limitation on the scope of the present invention which in its broad analysis disclosed the idea of reducing the effect of fluid density changes on centrifugal weights spinning in a fluid medium by the addition of a counterweight. Failure to satisfy the precise mathematical formulae should be considered a departure in degree only and not an avoidance of the fundamental novel idea disclosed herein.

We claim:

1. A centrifugal weight having an axis of rotation and a pivotable point located a spaced distance from said axis of rotation comprising: first and second interconnected masses located on opposite sides of a plane passing through said pivotable point and perpendicular to the axis of rotation; said first mass composed of material having a greater average density than said second mass; and the products of the volume, the distance from the centroid to the axis of rotation, and the distance from the centroid to said plane of said first and second masses are equal.

2. A centrifugal weight for rotation in a fluid medium having an axis of rotation and a pivot point located a spaced distance from said axis of rotation comprising: a flyweight member movable about said pivot point and operative to produce a centrifugal force that varies as a function of the rate of rotation about said axis of rotation, said flyweight member subject to an unwanted force due to a pressure gradient in the fluid medium in which said flyweight is rotating, said fluid medium subject to density variations operative to vary the magnitude of said unwanted force and introduce a force error responsive to changes in fluid density, counterweight means movable about said pivot point for receiving a counteracting force due to said pressure gradient which is operative to nullify said unwanted force and said force error responsive to changes in fluid density, said counterweight having a density less than said flyweight so that centrifugal force is not nullified.

3. In a fluid immersed governor, the combination of a revolving support, centrifugally and differentially acting weights arranged in pairs comprised of a flyweight and a counterweight, a lever for interconnecting said flyweight and said counterweight, a bracket mounted on said support, a pivot for said lever situated between said flyweight and said counterweight and supported by said bracket, said counterweight composed of material having less average density than said flyweight, and a means which opposes the resultant action of the weights.

4. In a fluid immersed governor, the combination as claimed in claim 3 wherein flyweight and said counterweight have substantially the same volume.

5. In a fluid immersed governor, the combination claimed in claim 4 wherein the distance of the flyweight centroid from said pivot is substantially the same as the distance from the counterweight centroid to said pivot.

6. In a fluid immersed governor, the combination of a revolving support, centrifugally and differentially acting weights arranged in pairs comprised of a flyweight and a counterweight, a lever for interconnecting said flyweight and said counterweight, a bracket mounted on said support, a pivot for said lever situated between said flyweight and said counterweight and supported by said bracket, said counterweight having substantially the same volume as said flyweight, and a means which opposes the resultant action of the weights.

7. Apparatus of the class described comprising, in combination: a first flyweight having a first density and a first volume mounted to rotate about an axis at a first radius; a second flyweight having a density unequal to the first density and having a volume equal to the first volume mounted to rotate about the axis at a distance equal to the first radius; an output member; and means connecting said first and second flyweights to said output member to exert opposing forces on said output member, the mechanical advantage of the means being the same for both flyweights.

8. A speed responsive device adapted to operate within a fluid medium, said device comprising a body adapted to be rotated in accordance with a parameter of speed, mounting members operatively connected to said body and adapted to be rotated with said body, pivot means retained by said mounting members, centrifugally responsive flyweight members including a main body portion mounted on said pivot means adapted in passing through said fluid medium to create a centrifugal force which is a function of the speed of rotation of said body, said main body portion having an inner surface relatively closer to the center of gyration of said flyweight member and an outer surface relatively farther away from the center of gyration of said flyweight, said inner and outer surfaces being effective for creating a first centrifugal pumping force opposing the centrifugal force created by the speed of rotation of said flyweights, and a second body portion secured to said flyweight so as to be normally urged by centrifugal force in a direction of travel about said pivot means opposite to the direction of travel incurred by said main body portion due to its centrifugal force and having a second inner surface and a second outer surface thereon, said second inner surface and said second outer surface being of such areas as to cause a second centrifugal pumping force of a magnitude substantially equal to and in opposition to said first centrifugal pumping force.

9. A flyweight governor having a first flyweight and a second flyweight disposed to rotate about an axis, a movable member, first and second connecting means connected, respectively, from said first flyweight to said member and from said second flyweight to said member to impart opposing forces to said member, the magnitude of said forces being dependent upon the speed of rotation, the density of said flyweights being unequal, and the product of the quantities comprising volumertric displacement, mechanical advantage of the associated connecting means, and radius of gyration of said first flyweight being substantially equal to the product of the like quantities of said second flyweight so that the resultant of said opposing forces on said movable member is constant regardless of the density of the medium surrounding said flyweights.

10. In a flyweight governor for operation in a fluid medium of variable density, a first flyweight and a second flyweight disposed to rotate about an axis and to produce centrifugal forces thereby, output means responsive to force, connecting means connecting said first flyweight and said second flyweight to said output means to apply said forces in opposing relation thereto, the density of said flyweights being unequal, and the product of the quantities comprising volumetric displacement, mechanical advantage of the associated connecting means, and radius of gyration of said first flyweight being substantially equal to the product of the like quantities of said second flyweight so that the resultant of said opposing forces is independent of the density of the medium surrounding said flyweights.

11. In a flyweight governor for operation in a fluid medium of variable density, a first flyweight and a second flyweight of unequal density disposed to rotate about an axis and to produce centrifugal forces thereby, output means responsive to force, connecting means connecting said first flyweight and said second flyweight to said output means to apply said forces in opposing relation thereto, the product of the mechanical advantage, the radius of gyration, and the volume of said first flyweight being equal to like quantities of said second flyweight, and means for maintaining the radii of gyration of said flyweights substantially constant throughout the operating range of the governor.

12. A flyweight governor comprising: a first flyweight and a second flyweight of different densities disposed to rotate about an axis; output means responsive to force; connecting means arranged to cause said flyweights to impart force from said flyweights to said output means so that said output means produces an output that varies with the difference between forces due to said first and said second flyweights; the characteristics of said first and second flyweights, said connecting means, and said output means being such that variations in the density of the medium surrounding said flyweights have substantially no effect on said output according to the relation:

$$F_0 = Y_1 r_1 \theta^2 V_1 (d_1 - j) - Y_2 r_2 \theta^2 V_2 (d_2 - j)$$

wherein,
$F_0$ is the resultant of the forces imparted to said member,
$Y_1$ is the mechanical advantage of the means connecting said first set of flyweights to said member,
$r_1$ is the radius of gyration of said first set of flyweights,
$\theta$ is the angular velocity of said flyweights,
$V_1$ is the volume of said first set of flyweights,
$Y_2$ is the mechanical advantage of the means connecting said second set of flyweights to said member,
$r_2$ is the radius of gyration of said second set of flyweights,
$V_2$ is the volume of said second set of flyweights,
$d_1$ is the density of said first set of flyweights,
$d_2$ is the density of said second set of flyweights,
$j$ is the density of said fluid medium, and
$Y_1 r_2 V_2 = Y_2 r_2 V_2$ and means for maintaing the radii of gyration of said flyweights substantially constant over the range of operation of the governor.

13. Apparatus of the class described comprising, in combination: a first flyweight having an effective density $d_1$, a volume $V_1$ and mounted for rotation about an axis at a radius $r_1$; an output member; means connecting said first flyweight to transmit a first force to said output member, said means providing a mechanical advantage $Y_1$ between said first flyweight and said output member; a second flyweight having an effective density $d_2$, a volume $V_2$ and mounted for rotation about an axis at a radius $r_2$; and means connecting said second flyweight to transmit a second force to said output member in a direction opposite the first force, the last named means providing a mechanical advantage $Y_2$ between said second flyweight and said output member, the relationship between the volumes, radii and mechanical advantages being $$Y_1 r_1 V_1 = Y_2 r_2 V_2$$

and the effective density $d_1$ being different than the effective density $d_2$.

References Cited by the Examiner

UNITED STATES PATENTS

| 742,874 | 11/03 | Junggren | 264—15 |
|---|---|---|---|
| 2,627,906 | 2/53 | Johnson | 264—15 |

RICHARD C. QUEISSER, *Primary Examiner.*

S. LEVINE, JAMES J. GILL, JOSEPH P. STRIZAK,
*Examiners.*